(12) United States Patent
Mangiat et al.

(10) Patent No.: US 9,131,150 B1
(45) Date of Patent: Sep. 8, 2015

(54) AUTOMATIC EXPOSURE CONTROL AND ILLUMINATION FOR HEAD TRACKING

(71) Applicant: Amazon Technologies, Inc., Reno, NV (US)

(72) Inventors: Stephen Vincent Mangiat, San Francisco, CA (US); Ambrish Tyagi, Palo Alto, CA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/298,769

(22) Filed: Jun. 6, 2014

(51) Int. Cl.
*H04N 5/232* (2006.01)
*H04N 5/235* (2006.01)

(52) U.S. Cl.
CPC ......... *H04N 5/23222* (2013.01); *H04N 5/2353* (2013.01); *H04N 5/23219* (2013.01)

(58) Field of Classification Search
CPC .......... H04N 5/23222; H04N 5/23219; H04N 5/2353; H04N 5/235; H04N 5/2355; H04N 5/2356; H04N 5/243; H04N 5/353; H04N 5/3559; H04N 5/35554; H04N 5/2351; H04N 5/35536; G03B 7/00; G03B 9/58; G03B 2207/00
See application file for complete search history.

(56) References Cited

U.S. PATENT DOCUMENTS

| | | | |
|---|---|---|---|
| 7,616,248 B2* | 11/2009 | Parulski et al. | 348/333.11 |
| 8,866,928 B2* | 10/2014 | Geiss | 348/222.1 |
| 8,964,062 B1* | 2/2015 | Neglur | 348/230.1 |
| 2009/0231467 A1* | 9/2009 | Yamashita et al. | 348/234 |
| 2011/0122254 A1* | 5/2011 | Ishii et al. | 348/169 |
| 2014/0307117 A1* | 10/2014 | Feng et al. | 348/218.1 |
| 2014/0362282 A1* | 12/2014 | Romanenko | 348/362 |

* cited by examiner

*Primary Examiner* — Aung S Moe
(74) *Attorney, Agent, or Firm* — Novak Druce Connolly Bove + Quigg LLP

(57) ABSTRACT

The subject technology provides embodiments for tracking a user's face/head (or another object) using one or more cameras provided by a computing device. Embodiments implement exposure sweeping based on an average intensity of a current scene to a target intensity for a given image. If a face is not detected, an exposure duration and/or gain may be adjusted and the face detection is performed again. Once the face is detected, an average intensity of a virtual bounding box surrounding the detected face is determined and exposure sweeping may be performed solely within the virtual bounding box to reach a target intensity. When the average intensity is within a predetermined threshold of the target intensity, the detected face may be at an optimal exposure. Embodiments also provide for switching to another camera(s) of the computing device when not detecting a face in the image upon performing a full exposure sweep.

20 Claims, 12 Drawing Sheets

AUTOMATIC EXPOSURE CONTROL AND ILLUMINATION FOR HEAD TRACKING

BACKGROUND

As personal electronic devices, such as laptop computers, tablets, smartphones, or head-mounted displays and other wearable computing devices (e.g., glasses, visors, watches, wristbands, etc.) become increasingly sophisticated, people are able to interact with such devices in new and interesting ways. For example, many personal electronic devices include touch interfaces that allow users to interact with these devices according to physical touch. A personal electronic device can also include one or more cameras located such that an image of the user's face can be captured by the cameras.

BRIEF DESCRIPTION OF THE DRAWINGS

The embodiments of the present technology will hereinafter be described in conjunction with the appended drawings, provided to illustrate and not to limit the technology, wherein like designations denote like elements, and in which.

DETAILED DESCRIPTION

Figure 1A:
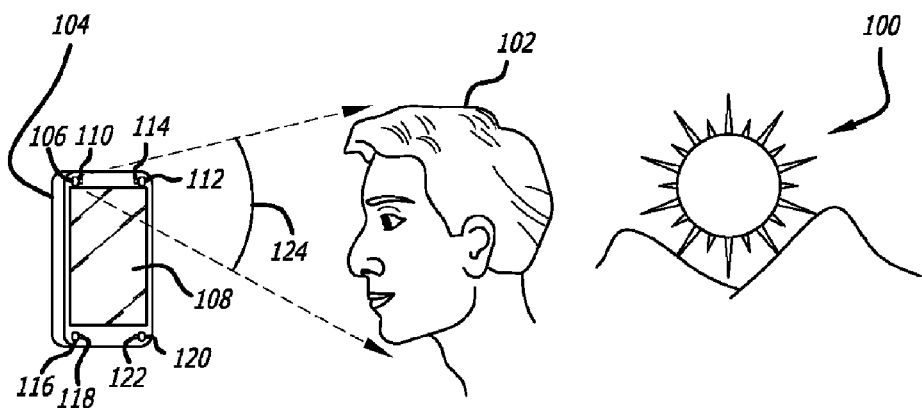
FIG. 1A illustrates an example situation of a user operating a computing device capable of dynamically detecting and tracking a user in accordance with various embodiments.

Systems and methods in accordance with various embodiments of the present disclosure may overcome one or more of the aforementioned and other deficiencies experienced in conventional approaches for detecting and/or tracking an object, such as a user. In particular, various embodiments involve detecting and tracking a portion of a user, such as the head or contours of the face of the user, and adjusting exposure settings and/or other camera settings to provide an optimized image for face detection and/or head tracking (among other purposes). Although examples described herein relate to tracking a user's head or face, in some embodiments, other portions of the user (e.g., "objects") that can be tracked by a device include a user's head, arms, hands, torso, legs, feet, or constituent components thereof (e.g., eyes, eyebrows, nose, or mouth of the user's head or fingertip, thumb, index finger, middle finger, ring finger, or pinkie of one of the user's hands). It is therefore appreciated that the subject technology may detect and/or track other objects corresponding to one or more different portions of the user or, in at least one embodiment, corresponding to a different subject altogether (e.g., an animal, a physical item of interest, etc.)

In some circumstances, depending on lighting conditions or other factors based on a current physical environment in which a user is situated in, a head or face of a user is not properly exposed. For example, in an environment with a bright background (e.g., sunlight), the user's face may be dark, or when the user is in complete darkness (e.g., nighttime). Other environments may pose challenging lighting conditions such as when the user is in a vehicle with lights passing by and/or changing during travel. With the advent of mobile or portable computing devices, lighting conditions may change over time as the user moves from one physical environment to another. Further, limitations of a camera sensor(s) provided by a mobile computing device due to physical, processing or power constraints, etc., may degrade image quality for face detection or head tracking. Consequently, a single exposure setting for the camera sensor may be not sufficient to find the user's face or head.

In at least one embodiment, a mobile computing device is equipped with front-facing cameras, with imaging sensors that respond to both visible and infrared (IR) light. In at least one embodiment, adjacent to each sensor is an IR LED, which can provide illumination on the face in dark environments; however it is appreciated that the IR LED may be used in brighter environments when the face is dark such as in a backlit scene. IR light, when provided by an IR LED, refers to electromagnetic radiation with longer wavelengths than those of visible light, which may range from the visible spectrum at 700 nanometers (nm) to 1 mm. The camera sequences are processed to track the position of the user's head, without any visual feedback or control provided to the user. As such, the subject technology automatically provides illumination on the user's face in all lighting environments when needed. The subject technology therefore may dynamically adapt the exposure for the user's face, without requiring user input, given current or changing lighting conditions.

Various other functions and advantages are described and suggested below in accordance with the various embodiments.

FIG. 1A illustrates an example situation 100 of a user 102 operating computing device 104 capable of dynamically detecting and tracking a user in accordance with various embodiments. Although a portable or mobile computing device (e.g., a smart phone, an electronic book reader, or tablet computer) is shown, it should be understood that any device capable of receiving and processing input can be used in accordance with various embodiments discussed herein, where the devices can include, for example, desktop computers, notebook computers, personal data assistants, smart phones, video gaming consoles, television set top boxes, portable media players, wearable computing devices, among others. In this example, the computing device 104 includes a display screen 108, which under normal operation will display information to a user facing the display screen (e.g., on the same side of the computing device as the display screen). The display screen 108 is a touchscreen including capacitive touch sensors and capable of detecting the user's fingertip touching points of the screen as input for the device. In some embodiments, the display element may implement a different touch technology (e.g., resistive, optical, ultrasonic) or may not be capable of detecting a user's touch at all.

In this example, the computing device 104 has four image capture elements 106, 112, 116 and 120 positioned at various locations on the same side of the device as the display screen 108, enabling the device to capture image information about a user of the device during typical operation where the user is at least partially in front of the display element. Each image capture element is a camera capable of capturing image information over a visible and/or infrared (IR) spectrum, and in at least some embodiments can select between visible and IR operational modes. For example, each of the image capture elements 106, 112, 116 and 120 comprises a digital camera incorporating a CMOS image sensor. For example, the CMOS image sensor may be an 8-bit greyscale image sensor that captures a 400 pixel×400 pixel image in at least one embodiment. In some embodiments, the imaging element can incorporate other image sensors (such as a charged couple device (CCD)) and/or can include multiple cameras, including at least one wide-angle optical element, such as a fish eye lens, that enables the camera to capture images over a wide range of angles, such as 180 degrees or more. Further, each image capture element can comprise a digital still camera, configured to capture subsequent frames in rapid succession, or a video camera able to capture streaming video. In the example of FIG. 1A, imaging element 106 is positioned so as to capture images of the head or face of the user 102 when he is positioned substantially in front of the display screen 108, where the user 102 would typically be positioned to interact with the device 104. Further, the imaging element 106 can correspond to an angular field of view 124 that is able to capture the user's face and/or contours of the user's face. As used herein, the contours of the user's face refers to the outline and/or shape of the user's head or face, such as an oval or oval-like shape for two-dimensional image data of the user or an ellipsoid for three-dimensional image data of the user, and the outlines and/or shapes of elements of the user's head or face, such as the user's hairline, eyebrows, eyes, nose, mouth, and/or ears.

In accordance with some embodiments, initial face detection of the user's face is achieved by converging on a set of target intensities (e.g., exposure sweeping) corresponding to a grey level in an image. In this regard, if no face is detected in the current scene, the subject technology may calculate a mean intensity (or grey value) of an entire image, and adjust or modify the exposure duration (e.g., the shutter speed) according to a ratio of a target intensity to the mean intensity by using multiple targets (e.g., 60, 120, 160 or 220 values of intensities for 8-bit images) so that the face is likely to be captured with optimal exposure in the image(s). In at least one embodiment, the mean or average intensity of the image is determined by taking a respective intensity value of each pixel and adding the values together, and dividing by a total number of pixels. In at least one embodiment, an initial target intensity may be selected based on the lowest value among the multiple targets and a subsequent target intensity (if needed) may be selected in ascending order; conversely the initial target intensity may be selected based on the highest value among the multiple targets and a subsequent target intensity (if needed) may be selected in descending order. In some embodiments, the initial target intensity may be selected based on one or more factors. For example, if the average intensity of the current scene is a high value (e.g., indicating a brightly lit scene such as a value >160), the target intensity may be selected to be a value lower than that high value; conversely, if the average intensity of the current scene is a low value (e.g., indicating a dark scene such as a value <90), the target intensity may be selected to be a value higher than the low value. It is appreciated that other ways to select the target intensity may be implemented and still be within the scope of the subject technology.

In some instances, the exposure of an image indicates an amount of light that reaches a sensor (e.g., based on an amount of time in which the sensor is accumulating light). Factors such as a camera's shutter speed and a brightness of a lens (e.g., f-number) may determine the exposure. In at least one embodiment, an exposure value (EV) is a single quantity based on a combination of a camera's shutter speed and f-number, such that all combinations that have the same exposure will also have the same EV value. In one embodiment, EV is a base-2 logarithmic scale defined by the following mathematical notation:

$$EV = \log_2 \frac{N^2}{t},$$

where N is the relative aperture (f-number) and t is the exposure time ("shutter speed") in seconds.

Several combinations of shutter speed and f-number may have the same exposure value. Although one or more different sets of shutter speed and f-number with the same EV nominally give the same exposure, the different sets do not necessarily give the same type of picture as captured by the camera. By way of example, a shutter speed of 1/50 second with an f/4.0 lens gives the same exposure value as a 1/100 second shutter speed with an f/2.8 lens, and also the same exposure value as a 1/200 second shutter speed with an f/2.0 lens. In this regard, the f-number (e.g., relative aperture of the lens) determines the depth of field, and the shutter speed (e.g., exposure time or duration) determines the amount of motion blur, which may result in drastically different pictures despite having the same EV values. In addition to its effect on exposure, the shutter speed changes the way movement appears in photographs. For example, short shutter speeds can be used to "freeze" a fast-moving subject(s), and long shutter speeds may be used to blur a moving subject(s).

In the example situation 100 of FIG. 1A, the computing device 104 is positioned in front of the user's face as the user views content, such as a document, e-book, photo, video, map, etc., displayed on the display element 108 of the device. In some embodiments that detect and track the head or face of the user based on a full frontal view of the user's head or face, a side profile of the user's head or face may not be detected. However, it will be appreciated that various embodiments can also detect and track a user according to a side profile of the head or face of the user (in addition to the full frontal view of the user's head or face). In this example, imaging element 106 is positioned so as to capture images of the head or face of the user 102 when he is positioned substantially in front of the display screen 108, where the user 102 would typically be positioned to interact with the device 104. Further, the imaging element 106 can correspond to an angular field of view 124 that is able to capture all of the contours of the user's face.

As further illustrated in the example of FIG. 1A, the computing device 104 includes illumination elements 110, 114, 118 and 122, such as a white light emitting diode (LED) or infrared (IR) emitter or LED for providing illumination in a particular range of directions when, for example, an exposure of the user's face is insufficient (e.g., in a dark environment). In at least one embodiment, one or more of the illumination elements may be used to detect the user's face as described further herein.

Figure 1B:
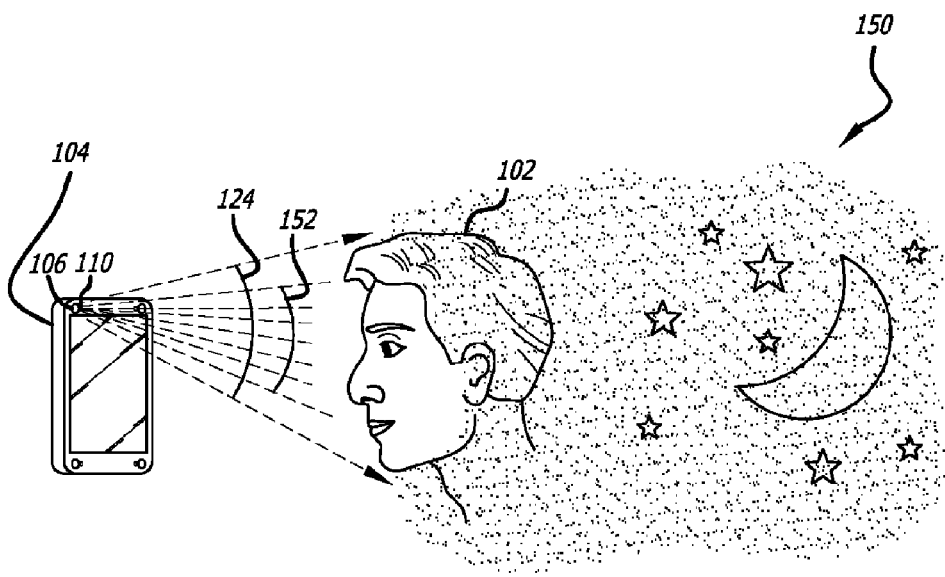
FIG. 1B illustrates the situation of the user and the computing device in an environment in which existing light in the current scene (e.g., at nighttime) is not sufficient to adequately illuminate the user's face in accordance with some embodiments.

FIG. 1B illustrates the situation 150 of the user 102 and the computing device 104 in an environment in which existing light in the current scene (e.g., at nighttime) is not sufficient to adequately illuminate the user's face. FIG. 1B is similar to FIG. 1A with a difference that the illumination element 110 has been activated for use in a dark environment where the user's face is not sufficiently exposed.

As shown, the illumination element 110 emits light in an angular field of view 152 that illuminates the user's face. In at least embodiment, the computing device 104 may increase a current of the illumination element 110 in order to increase an amount of light emitted. For example, a current of an IR LED provided by the illumination element 110 may be increased (up to a predefined maximum), until a face is detected. Further adjustments to the exposure settings may then be performed by the computing device 104 at that time. It should be understood that the illumination element 110 may be entirely controlled without user interaction based on the exposure of the current scene. Also, although a single illumination element is turned on in this example, it is appreciated that several illumination elements may be turned on. In an example, all of the illumination elements 110, 114, 118 and 122 may be turned on, and in one example, a subset of the illumination elements 110, 114, 118 and 122 may be turned on. Further, although the example of FIG. 1B depicts that an illumination element may be used in a nighttime (or dark) environment, it is appreciated that any number of illumination elements may be used in other environments including brightly-lit or daytime scenes, or other environments with varying degrees of lighting.

Figure 2A:
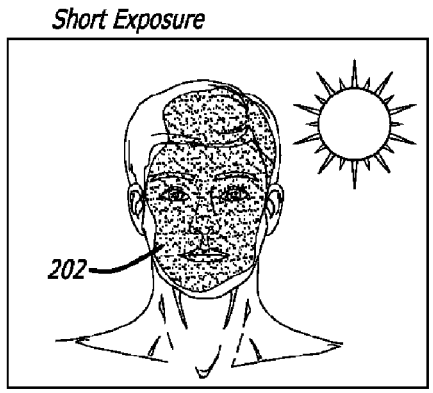
FIGS. 2A-2D illustrate examples of performing exposure scanning for face detection and/or head tracking in a brightly lit scene.

FIGS. 2A-2D illustrate examples of performing exposure scanning for face detection and/or head tracking in a brightly lit scene. FIG. 2A illustrates an example 200 in which a user 202 is present in a scene in which the user's face is darkened in a backlit scene (e.g., a dark subject in the foreground against a light background).

As discussed before, an initial face detection may be accomplished by converging on a set of target intensities via performing exposure sweeping. When a face is yet to be detected, a mean (or average) intensity of the entire image is determined, and an exposure duration (and/or gain) is adjusted or modified according to a ratio of the target intensity to the mean intensity (e.g., corresponding to a grey level in the image) (using multiple targets for light intensity, e.g. 60, 120, 160 or 220 for an 8-bit image(s) to have the face likely captured with "optimal" or sufficient exposure). For an 8-bit greyscale image (as captured by an 8-bit greyscale sensor), the intensity or grey level in the image may range from a value of 0-255. A greyscale image, in at least one embodiment, is an image in which the value of each pixel represents intensity information, which could vary from black at the lowest intensity to white at the highest intensity. The intensity of a pixel may represented within a given range between a minimum and a maximum value, such as 0-255. In this regard, this range is represented in an abstract way as a range from 0 (total absence, black) and 255 (total presence, white) in some embodiments.

If the brightness on the user's face is lower than the brightness of the background (common in backlit scenes), then the face will be adequately exposed when the average intensity of the entire image is relatively high. In FIG. 2A, a current exposure duration is set at a short exposure setting (e.g., small shutter speed) and, thus, the user's 202 face is dark. For a backlit scene, as in the example 200 of FIG. 2A, the average intensity of the entire image will be high (e.g., a value of 200). Thus, the user's face will be adequately exposed when the target intensity is high. In this example, the exposure duration or shutter speed may be adjusted or modified until reaching a selected target intensity. If the face is not detected at the selected intensity after adjusting the exposure duration (and/or gain setting in some embodiments discussed herein) for the camera, a next target intensity may be selected, the exposure duration adjusted and face detection may be performed again. These aforementioned steps may be repeated until a face is detected. To reduce the effect of lens flare or glare, the target intensity for an outdoor scene can be significantly reduced due to low noise at short exposures in some embodiments.

It is appreciated that any appropriate face detection technique(s) may be utilized and still be within the scope of the subject technology. In this regard, various approaches can be used to detect and track the features of a user within an image. Techniques for detecting a user can sometimes be characterized as either feature-based methods or appearance-based methods. Feature-based approaches generally involve extracting features from an image and applying various rules, metrics, or heuristics to determine whether a person is present in an image. Extracted features can be low-level image features, such as points (e.g., line intersections, high variance points, local curvature discontinuities of Gabor wavelets, inflection points of curves, local extrema of wavelet transforms, Harris corners, Shi Tomasi points), edges (e.g., Canny edges, Shen-Castan (ISEF) edges), or regions of interest (e.g., blobs, Laplacian of Gaussian blobs, Difference of Gaussian blobs, Hessian blobs, maximally stable extremum regions (MSERs)). An example of a low-level image feature-based approach for user detection is the grouping of edges method. In the grouping of edges method, an edge map (generated via, e.g., a Canny detector, Sobel filter, Marr-Hildreth edge operator) and heuristics are used to remove and group edges from an input image so that only the edges of the contour of a face remain. A box or ellipse is then fit to the boundary between the head region and the background. Low-level feature-based methods can also be based on gray level information or skin color. For example, facial features such as eyebrows, pupils, and lips generally appear darker than surrounding regions of the face and this observation can be used to detect a face within an image. In one such approach, a low resolution Gaussian or Laplacian of an input image is utilized to locate linear sequences of similarly oriented blobs and streaks, such as two dark blobs and three light blobs to represent eyes, cheekbones, and nose and streaks to represent the outline of the face, eyebrows, and lips. Geometric rules can be applied to analyze the spatial relationships among the blobs and streaks to verify whether a person is located in the image. Skin color can also be used as a basis for detecting and/or tracking a user because skin color comprises a limited range of the color spectrum that can be relatively efficient to locate in an image.

In at least one embodiment, a user's face may be detected based on one or more features (e.g., eyes, nose, mouth, etc.), and a face may be undetected when such features are not extracted or detected in a given image. Extracted features can be based on higher-level characteristics or the aforementioned features of a user, such as, but not limited to, eyes, nose, and/or mouth. Certain high-level feature-based methods can be characterized as top-down or bottom-up. A top-down approach first attempts to detect a particular user feature (e.g., head or face) and then validates existence of a person in an image by detecting constituent components of that user feature (e.g., eyes, nose, mouth). In contrast, a bottom-up approach begins by extracting the constituent components first and then confirming the presence of a person based on the constituent components being correctly arranged.

Additionally, some feature-based and appearance-based methods use trained classifier(s) to determine whether a user is represented in an image. Trained classifier(s) may be based on matching a pre-defined face pattern or parameterized function to locate the user within an image. Classifiers are typically prepared manually "offline."

Various other appearance-based methods can also be used to locate whether a user is represented in an image. Appearance-based methods typically use classifiers that are trained from positive examples of persons represented in images and negative examples of images with no persons. Application of the classifiers to an input image can determine whether a user exists in an image. Appearance-based methods can be based on principal component analysis (PCA), neural networks, support vector machines (SVMs), naïve Bayes classifiers, the Hidden Markov model (HMM), inductive learning, adaptive boosting (Adaboost), among others. Eigenfaces are an example of an approach based on PCA. PCA is performed on a training set of images known to include faces to determine the eigenvectors of the covariance matrix of the training set. The Eigenfaces span a subspace called the "face space." Images of faces are projected onto the subspace and clustered. To detect a face of a person in an image, the distance between a region of the image and the "face space" is computed for all location in the image. The distance from the "face space" is used as a measure of whether image subject matter comprises a face and the distances from "face space" form a "face map." A face can be detected from the local minima of the "face map."

Figure 2B:
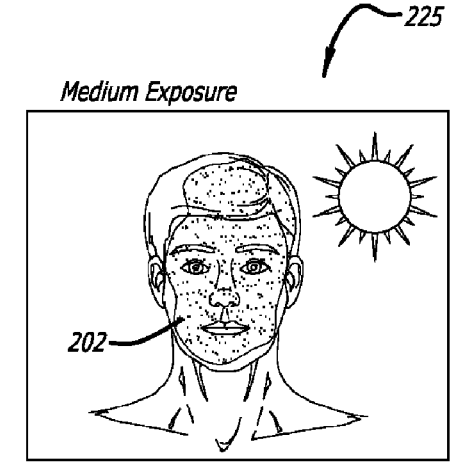

FIG. 2B shows an example 225 when the user's 202 face has not yet been detected. The current exposure duration is set to a medium exposure setting (e.g., medium shutter speed longer than the short shutter speed used in FIG. 2A) and the user's 202 face is more bright than the user's face in the example 200 in FIG. 2A. However, the user's 202 face is still not sufficiently bright or exposed in order for the face to be detected.

Figure 2C:
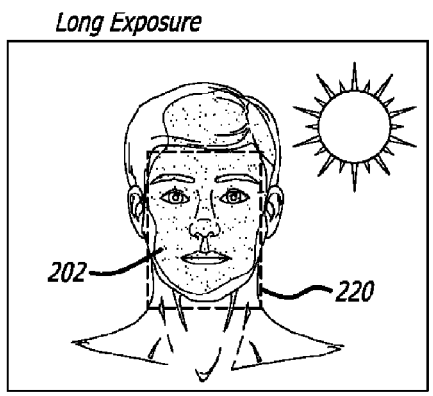

FIG. 2C illustrates an example 250 when the approximate position and orientation of the head or contours of a user's face has been detected at a particular target intensity as described before. The current exposure duration in the example 250 is at a long exposure setting (e.g., long shutter speed greater than the medium shutter speed used in FIG. 2B) As shown, a bounding or "virtual" box 220 is placed around the head or contours of the user's face. The mean intensity or grey level within the bounding box 220 is then determined. A target intensity within a midrange value (e.g., 90 for normal lighting) to provide high contrast within the face may be selected. The exposure and/or gain may be adjusted (e.g., modified) or adapted to reach the midrange target value. In at least one embodiment, the exposure has converged onto the target intensity when the average intensity is within a threshold such as plus or minus a value of 20. In an example in which the average intensity value within the bounding box 220 is 200, and the target intensity value is 100, the exposure duration within the bounding box 220 would have to be cut in half based on a ratio between the target intensity value and the average intensity value (e.g., 100/200=½).

Figure 2D:
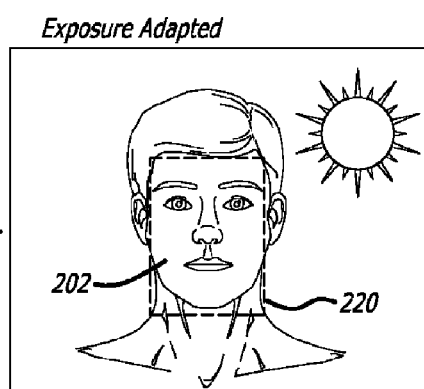

FIG. 2D illustrates an example 275 when the exposure of the user's face 202 has been adjusted (e.g., modified) or adapted to meet the target intensity value. In some embodiments, the mean intensity of the bounding box is determined. If the mean intensity is found to be within a predetermined threshold value of the target intensity value, such as within plus or minus a value of 20 from the target intensity, then the exposure of the user's 202 face is assumed to be at a suitable exposure. Further, utilizing the threshold value, a "ringing" effect around the user's face may be prevented.

In some embodiments, when a detected face is lost (e.g., going out of the view of the camera or being obscured or visually "blocked" by another object, etc.), the exposure duration and gain settings are fixed for a predetermined time (e.g. one second) before returning to exposure sweeping to detect the face again.

Figure 3A:
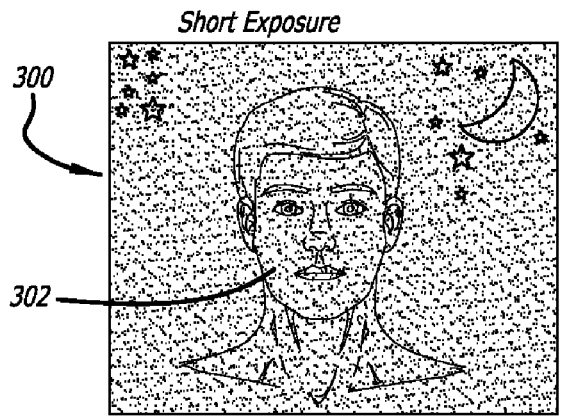
FIGS. 3A-3C illustrate examples of performing exposure scanning for face detection and/or head tracking in a dark scene.
Figure 3B:
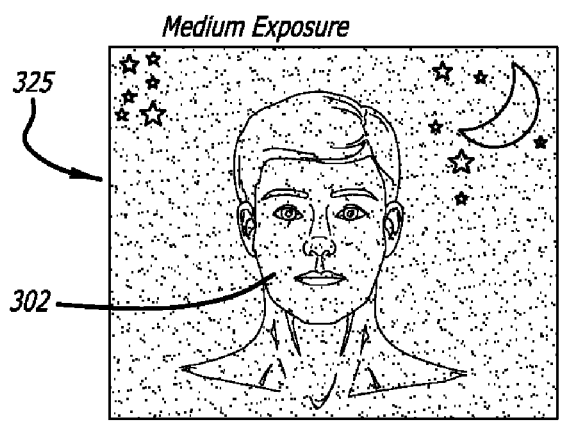
Figure 3C:
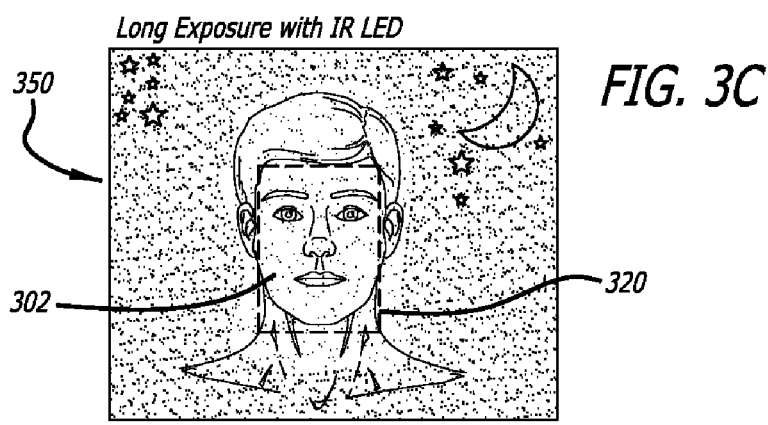

FIGS. 3A-3C illustrate examples of performing exposure scanning for face detection and/or head tracking in a dark or nighttime scene. FIG. 3A illustrates an example 300 in which a user 302 is present in a scene in which the user's face is darkened in a dark scene. In this example, the average intensity of the image shown may be a relatively low value. Exposure sweeping may be performed as described before by iterating through various target intensity values such as 60, 120, 160 or 220. To reach a target intensity in a dark scene, the exposure duration or shutter speed may have to be set to a maximum value provided by the camera. A gain of the image sensor may then be adjusted or modified after the exposure duration is maximized. As used herein, the gain of the image sensor, in the context of further adjusting or modifying the exposure, refers to a multiplier value or factor for the exposure duration, in which the range of values for adjusting the gain may be from 0 to 15. In this regard, the image sensor in some embodiments may have a fixed sensitivity or response to light and therefore the gain is changed rather than the sensitivity of the image sensor. Increasing the gain increases the signal amplification from the sensor and makes the sensor appear to be more sensitive. However, increasing the gain may result in increasing the noise relative to the signal, which may decreases the signal-to-noise ratio (SNR) of the image. In some embodiments, a signal to noise ratio for the image may be improved by adjusting the gain after the exposure duration. However, it is appreciated that in at least one embodiment the gain may be adjusted before the exposure duration.

FIG. 3B illustrates an example 325 after the exposure duration and gain are maximized. An average intensity of the image at this time may be determined and if it is less than a threshold amount (e.g., 30), then a dark environment is confirmed where solely adjusting the exposure duration and gain is insufficient to adequately perform face detection or head tracking. Although a dark environment is described in this example, it is appreciated that, in at least one other embodiment, the user's face may still be too dark while the current scene is in a brighter environment. To further adjust the exposure of a user's face for face detection or head tracking, one or more illumination elements (e.g., IR LEDs) may be automatically turned on to illuminate the user's head, which may be used in the dark environment of this example or in a brighter environment in another example(s) as discussed above.

FIG. 3C illustrates an example 350 wherein an illumination element (e.g., the IR LED adjacent to the current camera) is turned on with a minimum current and a fixed duration. The amount of light provided by the IR LED may depend an amount of current provided to the IR LED. In a dark environment such as the one shown in this example, the current of the IR LED may be initially set at a minimum amount (e.g., 50 mA) and increased up to a predefined maximum current (e.g., 100 mA) until a face is detected. The current may be increased incrementally (e.g., increasing in steps of 5-20 mA or any other increment amount) in some embodiments. Once a face is detected, a bounding or virtual box 320 may be placed around the head or contours of the user's 302 face. The average intensity of the bounding box 320 may be determined and compared to a target intensity value (e.g., 60) and the current of the IR LED is increased until the target intensity value is met.

In an example, the amount (or increment) that the current of the IR LED is increased is based on a linear ratio(s). For instance, the current is increased using the ratio of an IR-light intensity target (e.g., the target intensity amount) to the average intensity within the bounding box 320. For example, if the average intensity within the bounding box 320 is 30, the IR-light intensity target is 60, and the IR LED current is 10, then the current is adjusted or changed to 20 (e.g., 60/30=2). The current of the IR LED may be adjusted in the aforementioned manner based on the ratio between the intensity target and the average intensity until the intensity target is reached (or until the maximum current for the IR LED is reached).

If the scene starts to get brighter, the current of the IR LED is reduced until the IR LED reaches the minimum current. When the minimum current is reached for the LED and the average intensity is greater than the intensity target, the gain is decreased. When the gain is adjusted or modified below a predefined threshold (e.g., 4× or a multiplier factor of 4 times), the IR LED is turned off at this point in at least one embodiment. Further, when the gain is adjusted back to a zero value, then the exposure duration may be solely adjusted in order to reach the intensity target.

Although the above examples may involve a single camera, in various embodiments, a pair of cameras (e.g., stereo cameras) can concurrently capture image information from two different perspectives in order to provide, for example, stereo imaging capability. As part of the stereo image capture, image information may be obtained that includes information captured concurrently from both cameras, which can include a series of still images or length of video information. By combining the images from both cameras captured at substantially the same time, an amount of disparity (e.g., horizontal and/or depth displacement) of an object, such as a detected face, in the two images can be determined. For stereo cameras, if a face is found in an image from only one camera, the subject technology may calculate the mean intensity value in an image without a face (e.g., from the other camera in the stereo pair) using a bounding box predicted by stereo geometry and the range of depths or distances where the face may appear at in the image. Further, for stereo cameras, the current of an illumination element (e.g., IR LED) in a dark scene(s) may be adjusted using an estimate of the depth of the face.

Figure 8:
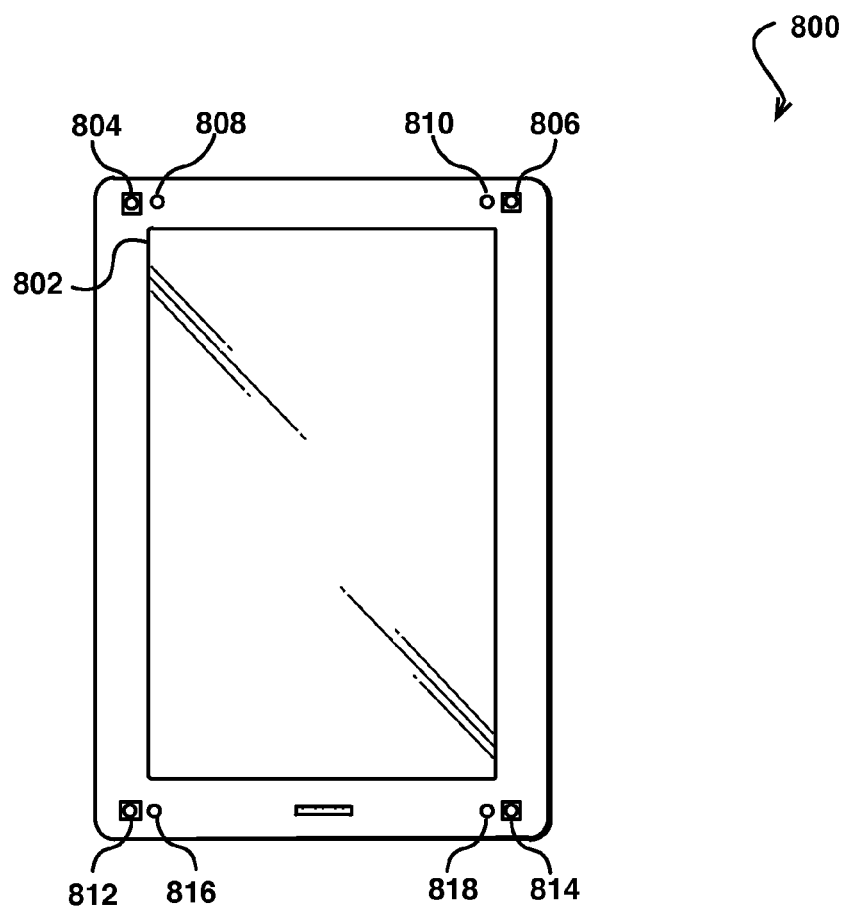
FIG. 8 illustrates an example computing device that can be used to perform methods in accordance with various embodiments discussed and suggested herein.

As described before in FIGS. 1A and 1B and further illustrated in FIG. 8, a computing device in accordance with some embodiments includes an array of cameras including 4 image capture elements (e.g., cameras). The subject technology may provide a technique for selecting stereo cameras in such a camera array for the purpose of 3D head or object tracking. Tracking in two cameras is required to output three dimensional (3D) position, and a user's head may be occluded or lie outside the field of view of one or more cameras. Additionally, one or more of the four front-facing cameras of the computing device may be occluded by the user (e.g., from a finger) when held in different orientations.

Figure 4A:
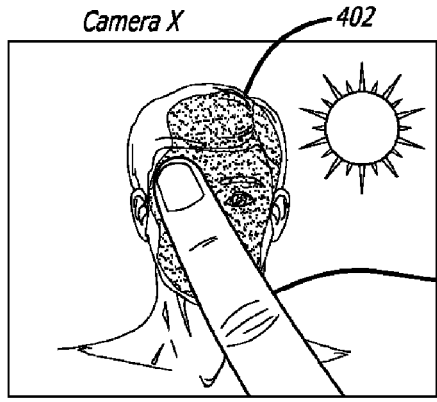
FIGS. 4A-4D illustrate examples of performing camera switching between pairs of cameras for face detection and/or head tracking when a user's face is occluded.

FIGS. 4A-4D illustrate examples of performing camera switching between pairs of cameras for face detection and/or head tracking when a user's face is occluded. In FIG. 4A, an example 400 illustrates a scene in which an occlusion 404 is blocking or covering user's 402 face (e.g., from the user's finger holding the computing device and covering the camera lens). A full exposure sweep as described before is performed by adjusting or modifying the exposure duration and/or gain before determining that a face is not found.

If there is no face detected in a camera after a full exposure sweep, then a switch to another camera is performed. In some embodiments, a camera can only switch to one other camera. For example, if there are four cameras labeled {0,1,2,3} (where camera 0 represents the bottom-right camera, camera 1 represents the bottom-left camera, camera 2 represents the top-right camera and camera 3 represents the top-left camera) then the pairs of switchable cameras are {0,1}, {0,2}, {3,1} and {3,2}. Thus, in such embodiments, switching between diagonal pairs of cameras is not possible (e.g., between camera pairs {1,2} and {0,3}). However, it is appreciated that in some embodiments, switching between diagonal pairs may be performed.

Figure 4B:
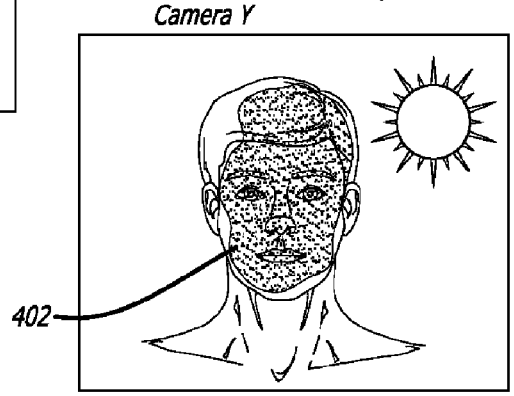
Figure 4C:
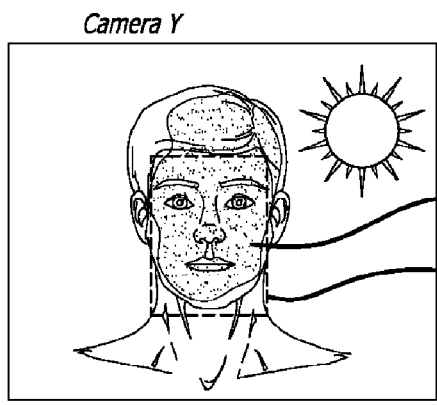
Figure 4D:
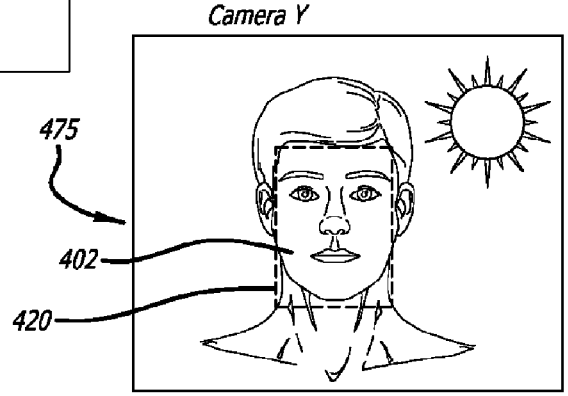

In some embodiments, the exposure and/or gain settings can then be linked between cameras {0,3} and cameras {1,2} (e.g., each pair of cameras being a diagonal pair) to use the settings from one camera to another camera for detecting or tracking the user's face without performing exposure sweeping. Consequently, faster face detection may be accomplished following a camera switch by reducing the exposure convergence delay. If there is a face detected in a camera, however, switching to another camera is not performed. In FIG. 4B, an example 425 illustrates a scene in which the user's 402 face is not occluded after performing the camera switching. FIG. 4C illustrates an example 450 in which exposure is adapted or modified to meet a target intensity and a bounding box 420 surrounds a detected face of the user 402. FIG. 4D illustrates an example 475 after the target intensity is met and the face 402 of the user is properly exposed.

Figure 5A:
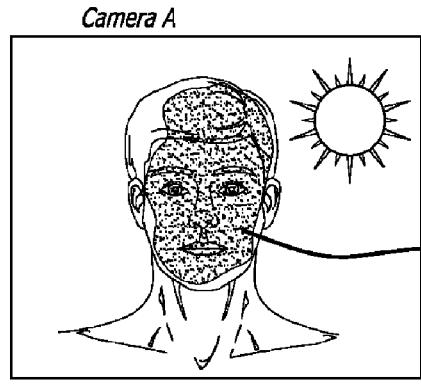
FIGS. 5A-5E illustrate examples of performing camera switching between pairs of cameras for face detection and/or head tracking when a previously detected face is lost.
Figure 5B:
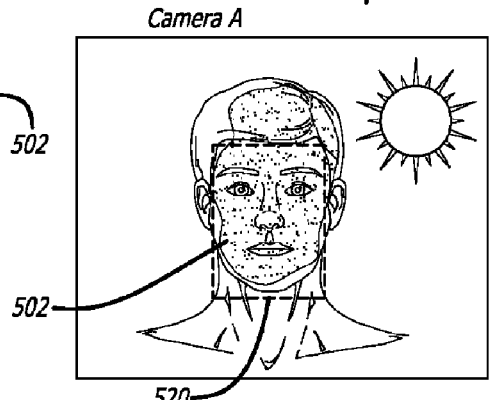
Figure 5C:
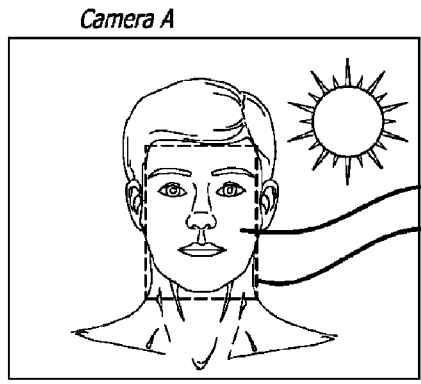

FIGS. 5A-5E illustrate examples of performing camera switching between pairs of cameras for face detection and/or head tracking when a previously detected face is lost. FIG. 5A illustrates an example 500 in which a face of a user 502 is darkened in a backlight background. FIG. 5B illustrates an example 515 in which the face of the user 502 is detected and a bounding box 520 surrounds the user's face. The exposure duration and/or gain is adjusted or adapted to meet a target intensity value. FIG. 5C illustrates an example 530 after the target intensity value is reached for the user's 502 face within the bounding box 520.

Figure 5D:
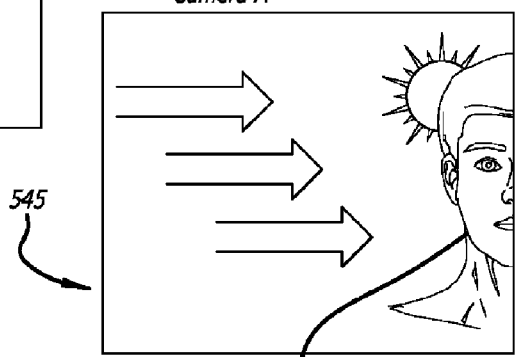

FIG. 5D illustrates an example 545 in which the user's face is lost (e.g., due to the user moving out of the view of the camera). In some embodiments, if a face is lost, a predetermined period of time is allowed to elapse before switching to another camera. This period of time is 350 ms when the camera is on top of the computing device with respect to the head orientation of the user, and 80 ms when the camera is on the bottom of the computing device with respect to the head orientation of the user. As a result, the differences between the period of times for the top and bottom cameras may favor the top camera pair with respect to head orientation, because the angle of view for a camera is more suitable for head tracking and the top camera pair is also less likely to be occluded by the user's hand.

Figure 5E:
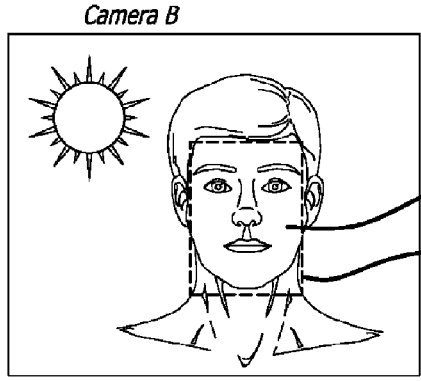

FIG. 5E illustrates an example 550 after camera switching has been performed and the user's 502 face is detected again. In some embodiments, if there is a face tracked in only one camera, exposure and/or gain settings of that camera may be assigned to the second camera immediately upon switching to it, since the second camera is likely to require similar settings to properly expose the user's face. Further, for camera arrays on mobile devices, gyroscope information may be used to aid switching of cameras. For example, such gyroscope information may be used to avoid switching during predefined motions (e.g., a tilt gesture) where the head will briefly leave the field of view. In this regard, operations in connection with performing exposure sweeping may be momentarily paused to allow the gesture(s) to be completed.

FIGS. 6A-6D illustrates steps of example processes 600, 650, 675 and 690 for performing exposure sweeping for head or face tracking that can be used in accordance with some embodiments of the subject technology. While the example processes 600, 650, 675 and 690 are illustrated with a particular order of steps, those of ordinary skill in the art will appreciate that FIGS. 6A-6D and the steps illustrated therein can be executed in parallel (e.g., at the same time) or in any order that accomplishes the technical advantages of the present disclosure and can include fewer or more steps than illustrated.

Each block shown in FIGS. 6A-6D may represent one or more processes, methods or subroutines. The steps illustrated in FIGS. 6A-6D can be implemented in a system including a mobile electronic device, such as a smartphone, a tablet computer, or any other electronic device configured to capture images. In some embodiments, the flow charts illustrated in FIGS. 6A-6D may be performed by the computing device 104 illustrated in FIGS. 1A-1B or the computing device 800 illustrated in FIG. 8.

Figure 6A:
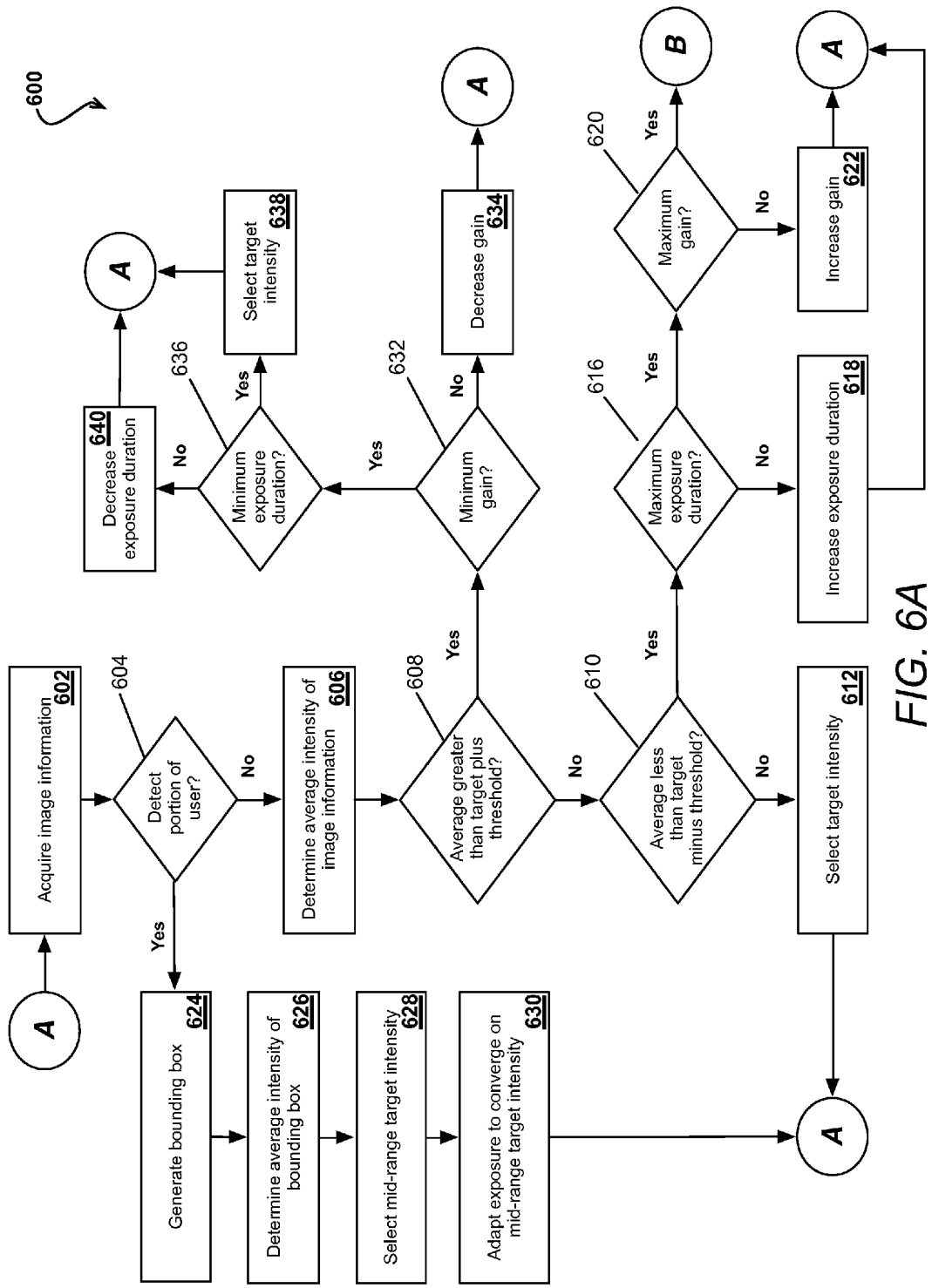
FIGS. 6A-6D illustrate steps of example processes for performing exposure sweeping for face detection and/or head tracking that can be used in accordance with some embodiments of the subject technology.

FIG. 6A illustrates an example process 600 for performing a first portion of exposure sweeping in accordance with some embodiments of the subject technology. At step 602, image information is acquired using a camera of the computing device. The acquired image information may have an exposure setting based at least on a current exposure setting (or default setting, predetermined setting, etc.) of the camera. At step 604, it is determined whether a portion of a user (e.g., the user's face or contours of the face) is detected. If the portion of the user is not detected, at step 606, an average intensity of the image information is determined. At step 608, it is determined whether the average intensity is greater than a target intensity plus a threshold value (e.g., 20 in at least one embodiment). If the average intensity is not greater than the target intensity plus the threshold value, a determination is made at step 610 whether the average intensity of the image information is less than the target intensity minus the threshold value. If not, at step 612, a (new) target intensity is selected from among a plurality of target intensities (as discussed before) in at least one embodiment. The process 600 goes back to step 602 (as indicated as "A") to perform the subsequent steps (e.g., acquiring new image information, etc.).

Continuing the discussion of the process 600 above, if at step 608 the average intensity is greater than the target intensity plus the threshold value, a determination is made at step 632 whether a gain is set at a minimum value (e.g., 0) as provided by the camera. If the gain is not set at the minimum value, at step 634 the gain is decreased (e.g., based on a ratio between the target intensity and the average intensity) and the process 600 goes back to step 602 (as indicated as "A") to perform the subsequent steps. Alternatively, if the gain is set at the minimum value, at step 636 a determination is made whether an exposure duration is set at a minimum value as provided by the camera. If not, the exposure duration is decreased at step 640 and the process 600 goes back to step 602 (as indicated as "A") to perform the subsequent steps. In at least one embodiment, the exposure duration is decreased based on a ratio between the target intensity and the average intensity. If the exposure duration is set at the minimum value, at step 638, a (new) target intensity is selected and the process 600 goes back to step 602 (as indicated as "A") to perform the subsequent steps.

Continuing the discussion of the process 600 above, if the average intensity is less than the target intensity minus the threshold value at step 610, a determination is made at step 616 whether the exposure duration is set at a maximum value as provided by the camera. If the exposure duration is not set at the maximum value, at step 618, the exposure duration is increased based at least in part on a ratio of the target intensity to the average intensity and the process 600 goes back to step 602 (as indicated as "A") to perform the subsequent steps. Alternatively, if the exposure duration is set at the maximum value, at step 620 a determination is made whether the gain is set at a maximum value (e.g., 15) as provided by the camera. If not, at step 622, the gain is increased (e.g., based on a ratio between the target intensity and the average intensity) and the process 600 goes back to step 602 (as indicated as "A") to perform the subsequent steps. Alternatively, if the gain has been set at the maximum value at step 620, the steps as illustrated in the following discussion of FIG. 6B may be performed.

Continuing the discussion of the process 600 above, if the portion of the user is detected at step 604, the process 600 continues to step 624 to generate a bounding box around the portion of the user (e.g., a face or contours of a head). At step 626, an average intensity is determined of image information (e.g., one or more pixels) included or surrounded by the bounding box. At step 628, a mid-range target intensity (e.g., 90) is selected. At step 630, the exposure duration is adapted (e.g., adjusted or modified) to converge on the mid-range target intensity so that the portion of the user within the bounding box is exposed properly. The process 600 goes back to step 602 (as indicated as "A") to perform the subsequent steps in at least one embodiment (e.g., to acquire new image information, etc.).

Figure 6B:
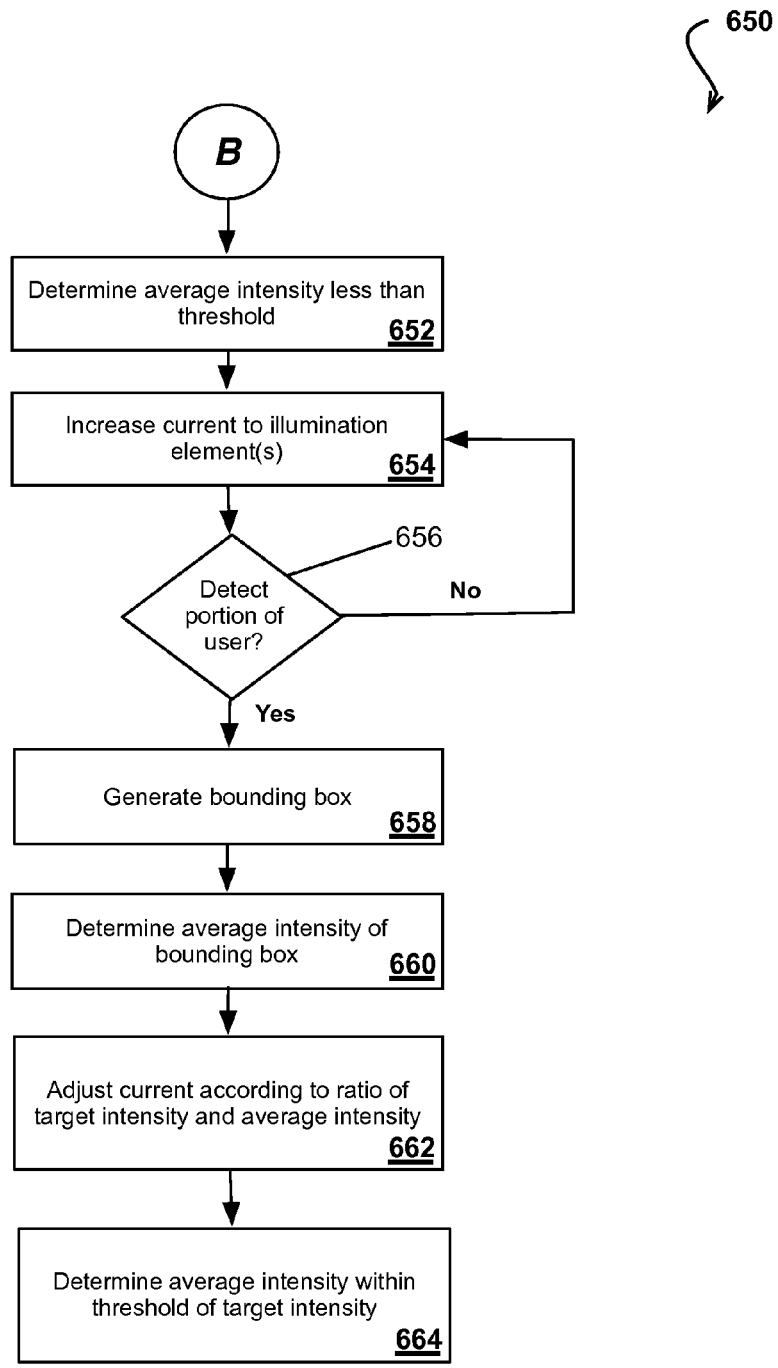

FIG. 6B illustrates an example process 650 for performing a second portion of exposure sweeping in accordance with some embodiments of the subject technology. At step 652, when the maximum exposure duration and the maximum gain have been reached, it is determined whether an average intensity is less than a threshold value (e.g., 30). At step 654, a current of an illumination element(s) (e.g., IR LED) is increased. At step 656, it is determined whether a portion of the user is detected. If not, the process 650 continues to step 654 to perform the following steps as illustrated. If the portion of the user is detected, a bounding box is generated around the detected portion of the user at step 658. At step 660, an average intensity of image information included within the bounding box is determined. At step 662, the current is adjusted or modified according to a ratio of a target intensity and the average intensity. At step 664, it is determined whether the average intensity is within a threshold amount of the target intensity. To fully perform exposure sweeping, in some embodiments, the steps 660 to 664 may be repeated until the average intensity is within the threshold amount of the target intensity.

Figure 6C:
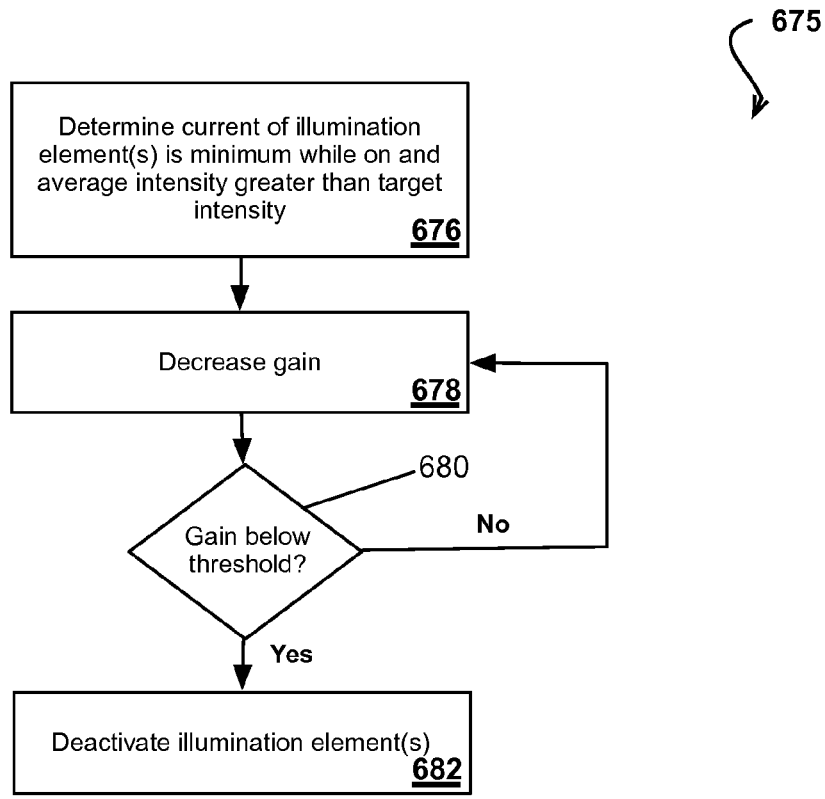

FIG. 6C illustrates an example process 675 for performing a third portion of exposure sweeping in accordance with some embodiments of the subject technology. At step 676, it is determined whether a current of an illumination element(s) is set to a predetermined minimum amount while the illumination element(s) is still on and an average intensity of at least a portion of the image information is greater than a target intensity. The minimum current that is needed for the illumination element to be turned on varies depending on the type of illumination hardware that is used in which some types of illumination hardware may require more current than other types in order to turn on or be activated. At step 678, the gain may be decreased in such instances. At step 680, it is determined whether the gain is below a threshold value. If the gain is below the threshold value (e.g., 4×), the illumination element(s) is deactivated (e.g., turned off) at step 682. Alternatively, if the gain is not below the threshold value, the gain may be continued to be decreased at step 678 (e.g., until reaching below the threshold value).

Figure 6D:
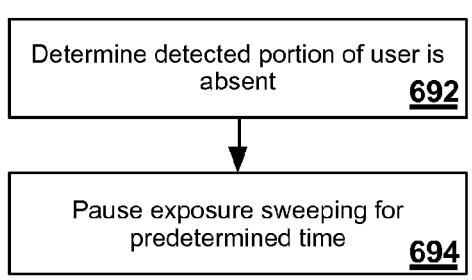

FIG. 6D illustrates an example process 690 for performing a fourth portion of exposure sweeping in accordance with some embodiments of the subject technology. At step 692, it is determined whether a detected portion of the user is absent (e.g., missing from a view of the camera). If so, at step 694, exposure sweeping may be paused for a predetermined time.

Figure 7A:
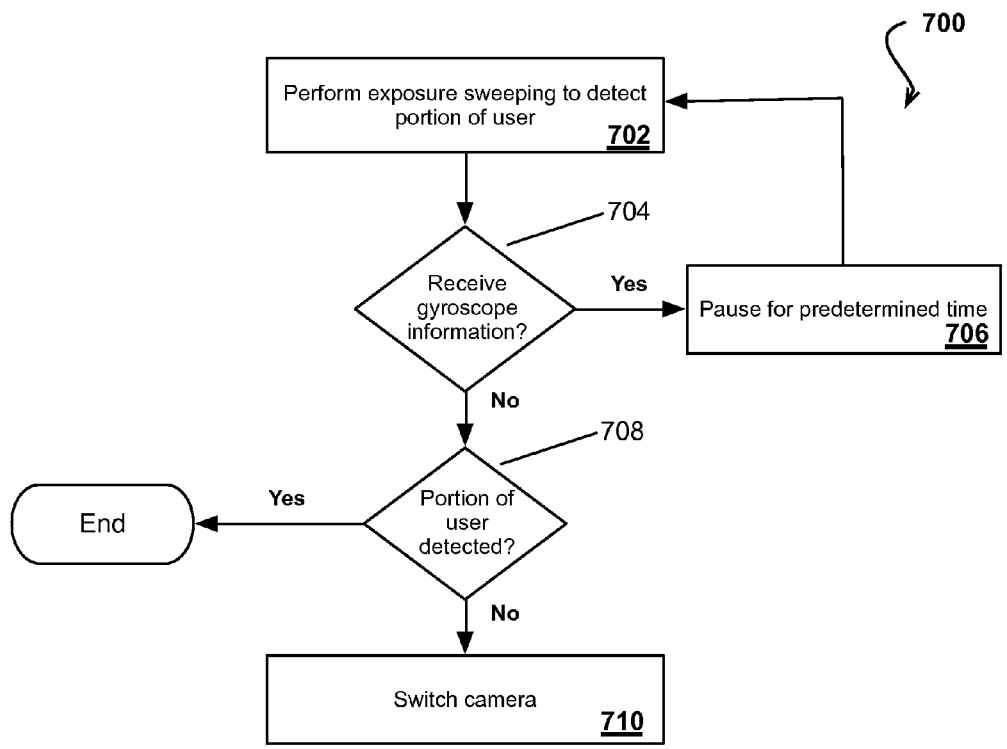
FIGS. 7A and 7B illustrate steps of example processes for switching between pairs of cameras for head tracking that can be used in accordance with some embodiments of the subject technology.
Figure 7B:
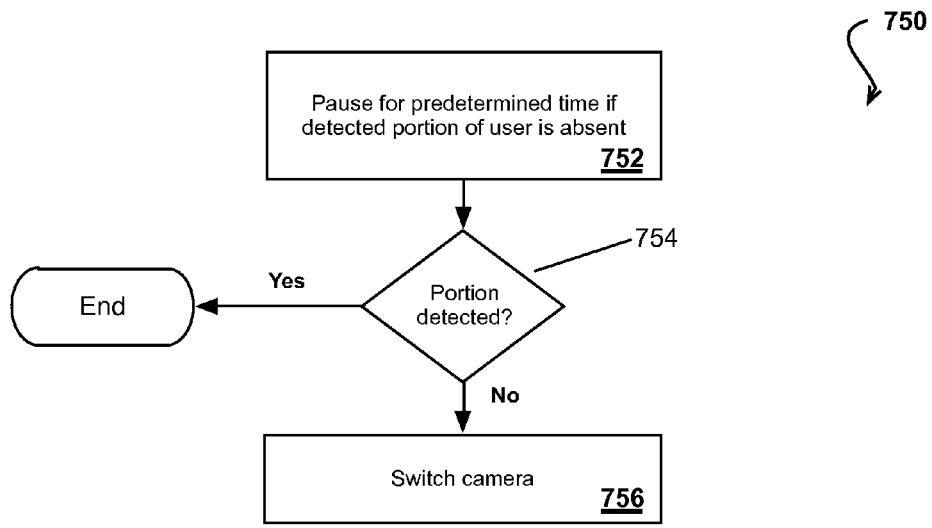

FIGS. 7A and 7B illustrates steps of example processes 700 and 750 for switching between pairs of cameras for head tracking that can be used in accordance with some embodiments of the subject technology. While the example processes 700 and 750 are illustrated with a particular order of steps, those of ordinary skill in the art will appreciate that FIGS. 7A and 7B and the steps illustrated therein can be executed in parallel (e.g., at the same time) or in any order that accomplishes the technical advantages of the present disclosure and can include fewer or more steps than illustrated. In some embodiments, the flow charts illustrated in FIGS. 7A and 7B may be performed by the computing device 104 illustrated in FIGS. 1A-1B or the computing device 800 illustrated in FIG. 8.

FIG. 7A illustrates an example process 700 for performing a first portion of camera switching in accordance with some embodiments of the subject technology. At step 702, exposure sweeping (as described herein) is performed using a first camera to detect a portion of a user. At step 704, it is determined whether gyroscope information is received (which may indicate that the user is performing a gesture with the computing device). If so, at step 706, exposure sweeping is paused for a predetermined time before the process 700 returns to step 702 to continue exposure sweeping. If gyroscope information has not been received, it is determined at step 708 whether the portion of the user has been detected. If so, the process 700 ends. Alternatively, if a full exposure sweep has been performed and no portion of the user has been detected, at step 710, the first camera is switched to a second camera. After being switched to the second camera, operations in connection with exposure sweeping to detect a face and/or perform head tracking may be executed.

FIG. 7B illustrates an example process 750 for performing a second portion of camera switching in accordance with some embodiments of the subject technology. At step 752, exposure sweeping may be paused for a predetermined time if a detected portion of the user in a first camera is absent (e.g., momentarily out of view of the camera). After the predetermined time has elapsed, at step 754, it is determined whether the portion of the user has been detected. If so, the process 750 ends. Alternatively, if the portion of the user has not been detected, the first camera is switched to a second camera at step 756. After being switched to the second camera, operations in connection with exposure sweeping to detect a face and/or perform head tracking may be executed.

FIG. 8 illustrates an example computing device 800 that can be used to perform methods in accordance with various embodiments discussed and suggested herein. In this example, the device has four image capture elements 804, 806, 812, 814 positioned at various locations on the same side of the device as a display element 802, enabling the device to capture image information about a user of the device during typical operation where the user is at least partially in front of the display element. In this example, each capture element is a camera capable of capturing image information over a visible and/or infrared (IR) spectrum, and in at least some embodiments can select between visible and IR operational modes. It should be understood, however, that there can be fewer or additional elements of similar or alternative types in other embodiments, and that there can be combinations of cameras, infrared detectors, gesture sensors, and other such elements used with various devices.

In this example, the computing device 800 includes illumination elements 808, 810, 816 and 818 positioned at various locations on the same side of the device as a display element 802, such as a white light diode (LED) or infrared (IR) emitter (e.g., IR LED), as discussed elsewhere herein, for providing illumination in a particular range of directions when, for example, there is insufficient ambient light determined by a light sensor or reflected IR radiation is to be captured. Additionally, as further described herein, one or more of the illumination elements 808, 810, 816 and 818 may be turned on in accordance with some embodiments. Further, the computing device 800 may include one or more light sensors (not shown) to determine an amount of light in a general direction of objects to be captured.

The computing device 800 can have a material and/or components that enable a user to provide "squeeze" input to the device by applying pressure at one or more locations. A device casing can also include touch-sensitive material that enables a user to provide input by sliding a finger or other object along a portion of the casing. Various other elements and combinations of elements can be used as well within the scope of the various embodiments as should be apparent in light of the teachings and suggestions contained herein.

Figure 9:
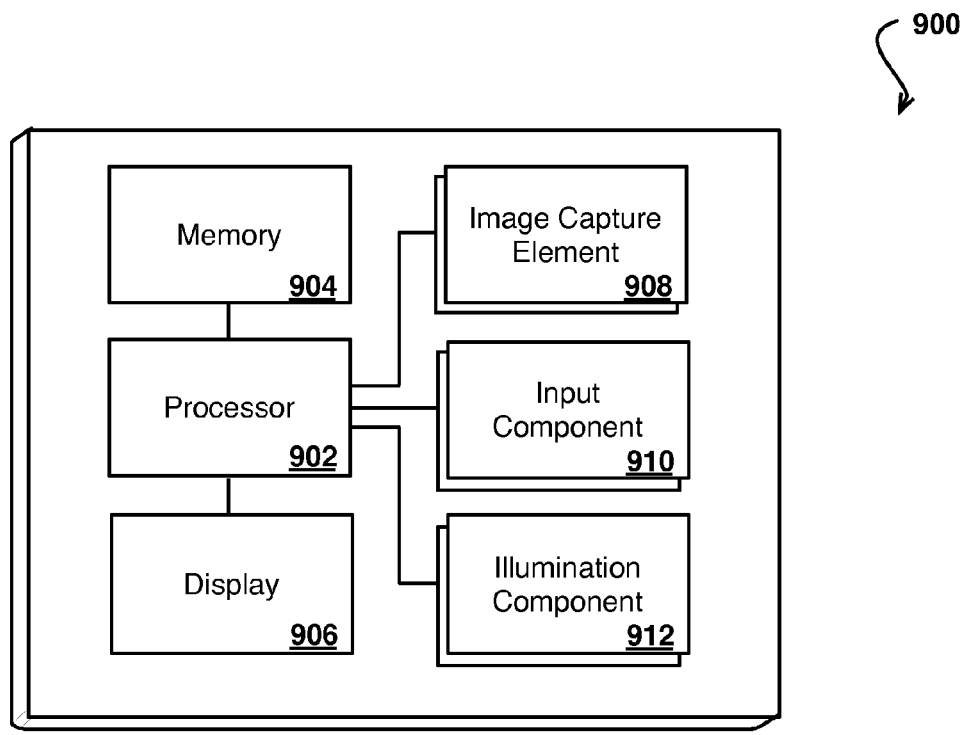
FIG. 9 illustrates an example set of basic components of a computing device, such as the device described with respect to FIG. 8.

In order to provide various functionality described herein, FIG. 9 illustrates an example set of basic components of a computing device 900, such as the device 800 described with respect to FIG. 8. In this example, the device includes at least one central processor 902 for executing instructions that can be stored in at least one memory device or element 904. As would be apparent to one of ordinary skill in the art, the device can include many types of memory, data storage or non-transitory computer-readable storage media, such as a first data storage for program instructions for execution by the processor 902, the same or separate storage can be used for images or data, a removable storage memory can be available for sharing information with other devices, etc. The device typically will include some type of display element 906, such as a touch screen, electronic ink (e-ink), organic light emitting diode (OLED) or liquid crystal display (LCD), although devices such as portable media players might convey information via other means, such as through audio speakers. In at least some embodiments, the display screen provides for touch or swipe-based input using, for example, capacitive or resistive touch technology.

As discussed, the device in many embodiments will include at least one image capture element 908, such as one or more cameras that are able to image a user, people, or objects in the vicinity of the device. An image capture element can include, or be based at least in part upon any appropriate technology, such as a CCD or CMOS image capture element having a determined resolution, focal range, viewable area, and capture rate. The image capture elements can also include at least one IR sensor or detector operable to capture image information for use in determining gestures or motions of the user. The example device includes at least one motion determining component 910, such as an electronic gyroscope used to determine motion of the device for assistance in input determination. The device also can include at least one illumination element 912, as may include one or more light sources (e.g., white light LEDs, IR emitters, or flashlamps) for providing illumination and/or one or more light sensors or detectors for detecting ambient light or intensity, etc.

The example device can include at least one additional input device able to receive conventional input from a user. This conventional input can include, for example, a push button, touch pad, touch screen, wheel, joystick, keypad, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual (e.g., gesture) and audio (e.g., spoken) commands such that a user can control the device without having to be in contact with the device.

In some embodiments, the device 900 can include the ability to activate and/or deactivate detection and/or command modes, such as when receiving a command from a user or an application, or retrying to determine an audio input or video input, etc. For example, a device might not attempt to detect or communicate with devices when there is not a user in the room. If a proximity sensor of the device, such as an IR sensor, detects a user entering the room, for instance, the device can activate a detection or control mode such that the device can be ready when needed by the user, but conserve power and resources when a user is not nearby.

In some embodiments, the computing device 900 may include a light-detecting element that is able to determine whether the device is exposed to ambient light or is in relative or complete darkness. In some embodiments, the device may include a display element that can operate in different modes, such as reflective (for bright situations) and emissive (for dark situations). Based on the detected light, the device may change modes.

Figure 10:
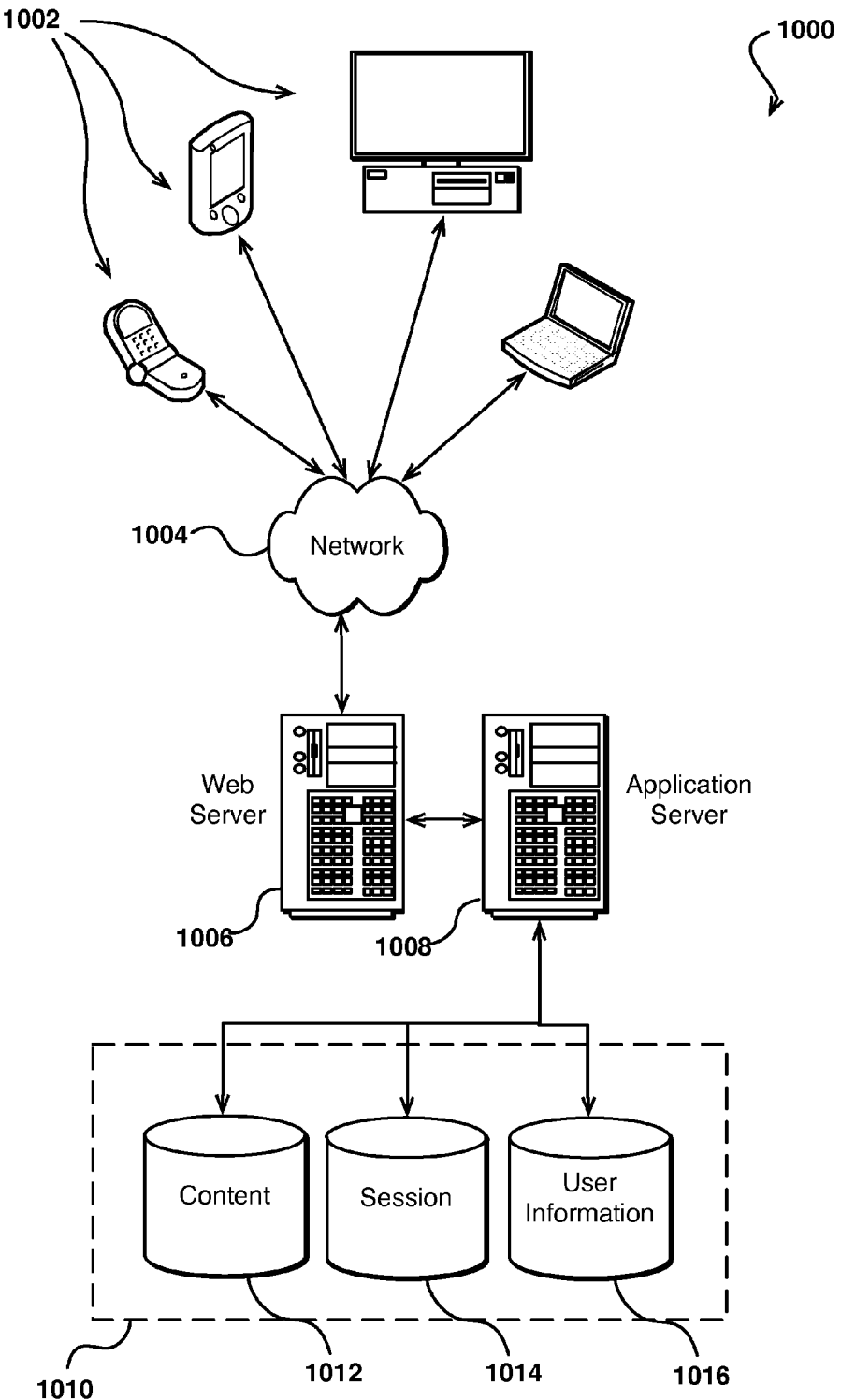
FIG. 10 illustrates an example of an environment for implementing aspects in accordance with various embodiments of the subject technology.

As discussed, different approaches can be implemented in various environments in accordance with the described embodiments. For example, FIG. 10 illustrates an example of an environment 1000 for implementing aspects in accordance with various embodiments. As will be appreciated, although a Web-based environment is used for purposes of explanation, different environments may be used, as appropriate, to implement various embodiments. The system includes an electronic client device 1002, which can include any appropriate device operable to send and receive requests, messages or information over an appropriate network 1004 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1006 for receiving requests and serving content in response thereto, although for other networks, an alternative device serving a similar purpose could be used, as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1008 can include any appropriate hardware and software for integrating with the data store 1010 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1006 in the form of HTML, XML or another appropriate structured language in this example. The handling of all requests and responses, as well as the delivery of content between the client device 1002 and the application server 1008, can be handled by the Web server 1006. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing content (e.g., production data) 1012 and user information 1016, which can be used to serve content for the production side. The data store is also shown to include a mechanism for storing log or session data 1014. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN"). Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate storage media used in the art, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device comprising:
   at least one processor;
   a camera configured according to a current exposure duration setting; and
   a memory device including instructions that, when executed by the at least one processor, cause the at least one processor to:
   acquire image information using the camera, the image information including intensity information for a plurality of pixels, the intensity information corresponding to respective grey levels for each of the plurality of pixels;

determine that a representation of a face of a user is undetected in the image information;

select a first target intensity value from a plurality of target intensity values, each of the target intensity values being different values within a range of possible intensity values;

determine a first average intensity value of the intensity information for the plurality of pixels;

determine a ratio of the first target intensity value to the first average intensity value;

adjust the current exposure duration setting to be a second exposure duration setting according to the ratio;

acquire second image information at the second exposure duration setting, the second image information including second intensity information for a second plurality of pixels, the second intensity information corresponding to respective grey levels for each of the second plurality of pixels;

detect, subsequent to acquiring the second image information, the representation of a face of a user in the second image information at the second exposure duration setting;

generate a bounding box, the bounding box comprising pixels surrounding the representation of the face of the user in the second image information;

determine a second average intensity value of a subset of pixels of the second plurality of pixels that correspond to the representation of the face surrounded by the pixels of the bounding box;

adjust the second exposure duration setting of the subset of pixels of the second plurality of pixels to be a third exposure duration setting based at least in part on a second ratio of a second target intensity value to the second average intensity value, the second target intensity value comprising a substantially mid-range value from the range of possible intensity values; and determine, subsequent to adjusting the second exposure duration setting, that a third average intensity value of the subset of pixels of the second plurality of pixels is within a threshold amount to the second target intensity value.

2. The computing device of claim 1, wherein the instructions further cause the at least one processor to:

determine, in the second plurality of pixels, that the representation of the face of the user is undetected at a fourth exposure duration setting;

select a different target intensity value from the plurality of target intensity values if the representation of the face of the user is undetected;

determine a current average intensity value of the intensity information for the second plurality of pixels;

determine a ratio of the different target intensity value to the current average intensity value; and adjust the fourth exposure duration setting to a fifth exposure duration setting based at least in part on the determined ratio.

3. The computing device of claim 1, wherein the instructions further cause the at least one processor to:

determine, in the second plurality of pixels, that a fourth current exposure duration setting is at a maximum exposure duration value provided by the camera; and adjust, after determining that the fourth exposure duration is at the maximum exposure duration value, a gain of the camera;

determine that the gain of the camera is at a maximum gain value provided by the camera;

determine that a current average intensity value of the intensity information of the second plurality of pixels is less than a predetermined threshold value, the predetermined threshold value indicating a dark environment; and activate, after determining that the current average intensity value is less than the predetermined threshold value, an illumination element of the camera.

4. A computer-implemented method, the method comprising:

acquiring image data using a camera of a computing device configured according to an exposure duration;

determining that a representation of an object is undetected in the image data;

determining a first average intensity value of the image data;

adjusting the exposure duration to be at an adjusted exposure duration based on a ratio of a first target intensity value to the first average intensity value;

detecting the representation of the object in the image data;

determining a second average intensity value of the representation; and adjusting the adjusted exposure duration of the representation to be at a second exposure duration based on a second ratio of a second target intensity value to the second average intensity value, wherein the second ratio is different than the ratio.

5. The computer-implemented method of claim 4, wherein the computing device includes an array of cameras, the array of cameras including one or more additional cameras and the camera.

6. The computer-implemented method of claim 4, further comprising:

determining, after adjusting the adjusted exposure duration, that a third average intensity value of the representation is within a threshold amount to the second target intensity value.

7. The computer-implemented method of claim 4, wherein adjusting the exposure duration to be at the adjusted exposure duration further comprises:

selecting the first target intensity value from a plurality of target intensity values, each of the target intensity values being different intensity values.

8. The computer-implemented method of claim 4, further comprising:

determining that the representation of the object is undetected at a third exposure duration, the representation of the object comprising a representation of a portion of a user;

selecting a different target intensity value from a plurality of target intensity values;

determining a current average intensity value of the image data;

determining a different ratio of the different target intensity value to the current average intensity value; and adjusting the third exposure duration to be at a fourth exposure duration based at least in part on the determined ratio.

9. The computer-implemented method of claim 4, further comprising:

maintaining, for a period of time, a current setting of the exposure duration in response to the detected representation being absent in subsequent image data.

10. The computer-implemented method of claim 4, further comprising:

determining that the exposure duration is at a maximum exposure duration value provided by the camera; and adjusting a gain of the camera in response to the exposure duration being at the maximum exposure duration value.

11. The computer-implemented method of claim 10, further comprising:

determining that the gain of the camera is at a maximum gain value provided by the camera;

determining that a current average intensity value of the image data is less than a predetermined threshold value, the predetermined threshold value indicating a dark environment; and activating an illumination element of the camera in response to the current average intensity value being less than the predetermined threshold value.

12. The computer-implemented method of claim 11, further comprising:

increasing a current of the illumination element up to a maximum current value provided by the illumination element until the representation is detected in subsequent image data.

13. The computer-implemented method of claim 12, further comprising:

adjusting the current of the illumination element based on a third ratio between a third average intensity of the representation in the subsequent image data to a third target intensity value.

14. The computer-implemented method of claim 13, further comprising:

determining that the current of the illumination current is at a minimum current value provided by the illumination element and the third average intensity value is greater than the third target intensity value;

decreasing the gain of the camera until the gain is below a predetermined threshold gain value; and deactivating the illumination element.

15. A non-transitory computer-readable medium including instructions stored therein that, when executed by at least one computing device, cause the at least one computing device to:

acquire image data using a camera of a computing device configured according to an exposure duration;

determine that a representation of an object is undetected in the image data;

determine a first average intensity value of the image data;

adjust the exposure duration to be at an adjusted exposure duration based on a ratio of a first target intensity value to the first average intensity value;

detect the representation of the object in the image data;

determine a second average intensity value of the representation; and adjust the adjusted exposure duration of the representation to be at a second exposure duration based on a second ratio of a second target intensity value to the second average intensity value, wherein the second ratio is different than the ratio.

16. The non-transitory computer-readable medium of claim 15, wherein to adjust the exposure duration to be at the adjusted exposure duration further causes the at least one computing device to:

select the first target intensity value from a plurality of target intensity values, each of the target intensity values being different intensity values.

17. The non-transitory computer-readable medium of claim 15, wherein the instructions further cause the at least one computing device to:

determine that the representation of the object is undetected at a third exposure duration, the representation of the object comprising a representation of a portion of a user;

select a different target intensity value from a plurality of target intensity values;

determine a current average intensity value of the image data;

determine a different ratio of the different target intensity value to the current average intensity value; and adjust the third exposure duration to be at a fourth exposure duration based at least in part on the determined ratio.

18. The non-transitory computer-readable medium of claim 15, wherein the instructions further cause the at least one computing device to:

determine that the exposure duration is at a maximum exposure duration value provided by the camera; and adjust a gain of the camera in response to the exposure duration being at the maximum exposure duration value.

19. The non-transitory computer-readable medium of claim 18, wherein the instructions further cause the at least one computing device to:

determine that the gain of the camera is at a maximum gain value provided by the camera;

determine that a current average intensity value of the image data is less than a predetermined threshold value, the predetermined threshold value indicating a dark environment; and activate an illumination element of the camera in response to the current average intensity value being less than the predetermined threshold value.

20. The non-transitory computer-readable medium of claim 19, wherein the instructions further cause the at least one computing device to:

increase a current of the illumination element up to a maximum current value provided by the illumination element until the representation is detected in subsequent image data;

adjust the current of the illumination element based on a third ratio between a third average intensity of the representation in the subsequent image data to a third target intensity value;

determine that the current of the illumination current is at a minimum current value provided by the illumination element and the third average intensity value is greater than the third target intensity value;

decrease the gain of the camera until the gain is below a predetermined threshold gain value; and deactivate the illumination element.

\* \* \* \* \*